United States Patent
Allen

(10) Patent No.: US 11,619,834 B2
(45) Date of Patent: Apr. 4, 2023

(54) ILLUMINATED LENS FRAME

(71) Applicant: William Allen, Minneapolis, MN (US)

(72) Inventor: William Allen, Minneapolis, MN (US)

( * ) Notice: Subject to any disclaimer, the term of this patent is extended or adjusted under 35 U.S.C. 154(b) by 917 days.

(21) Appl. No.: 15/962,026

(22) Filed: Apr. 25, 2018

(65) Prior Publication Data
US 2019/0331936 A1    Oct. 31, 2019

(51) Int. Cl.
*G02C 11/04*   (2006.01)
*G03B 21/00*   (2006.01)
*F21V 23/00*   (2015.01)
*G02C 11/02*   (2006.01)

(52) U.S. Cl.
CPC .......... *G02C 11/04* (2013.01); *F21V 23/003* (2013.01); *G02C 11/02* (2013.01); *G03B 21/00* (2013.01)

(58) Field of Classification Search
None
See application file for complete search history.

(56) References Cited

U.S. PATENT DOCUMENTS

| | | | |
|---|---|---|---|
| 6,857,739 B1 | 2/2005 | Watson | |
| 6,997,552 B1 | 2/2006 | Hung | |
| 8,228,315 B1 * | 7/2012 | Starner | G06F 3/0304 345/175 |
| 8,514,097 B2 | 8/2013 | Boise | |
| 8,705,177 B1 * | 4/2014 | Miao | G02B 27/0172 359/630 |
| 9,513,495 B2 | 12/2016 | Waters | |
| 2014/0146394 A1 * | 5/2014 | Tout | G02B 27/017 359/630 |
| 2015/0362759 A1 | 12/2015 | Verkaik et al. | |
| 2017/0068120 A1 | 3/2017 | Shiratori | |
| 2017/0102562 A1 | 4/2017 | Ban | |

FOREIGN PATENT DOCUMENTS

| | | | |
|---|---|---|---|
| CN | 201355409 | 12/2009 | |
| KR | 2016-KR-0110847 | 9/2016 | |
| WO | WO-9409398 A1 * | 4/1994 | G02B 27/017 |
| WO | WO2014204916 | 12/2014 | |

* cited by examiner

Primary Examiner — Darryl J Collins

(57) ABSTRACT

An illuminated eyewear includes a lens support including a frame with a pair of rims and a bridge that is attached to and extends between the rims. A first temple is attached to one of the rims and a second temple is attached to another one of the rims. A pair of lenses is mounted to the frame wherein each of the rims engages one of the lenses. A light source is mounted on the lens support and illuminating perimeter edges of the lenses when the light source is turned on.

15 Claims, 4 Drawing Sheets

ILLUMINATED LENS FRAME

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to eyewear assemblies and more particularly pertains to a new eyewear assembly for allowing a person to alter the appearance of eyewear by manipulating light and light color emanating from the eyewear.

BRIEF SUMMARY OF THE INVENTION

An embodiment of the disclosure meets the needs presented above by generally comprising a lens support including a frame with a pair of rims and a bridge that is attached to and extends between the rims. A first temple is attached to one of the rims and a second temple is attached to another one of the rims. A pair of lenses is mounted to the frame wherein each of the rims engages one of the lenses. A light source is mounted on the lens support and illuminating perimeter edges of the lenses when the light source is turned on.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
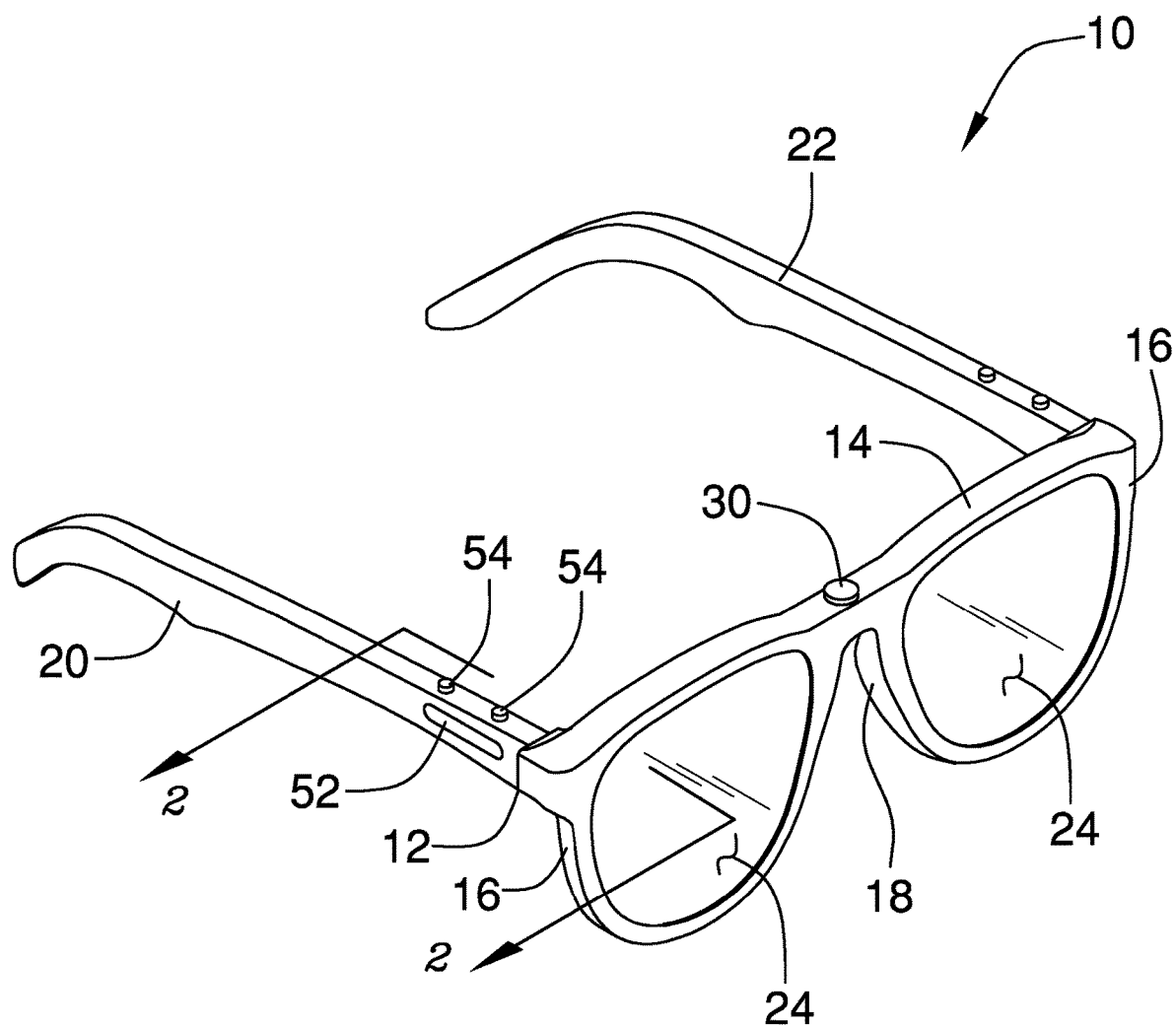
FIG. 1 is a top and front isometric view of a illuminated eyewear according to an embodiment of the disclosure.
Figure 2:
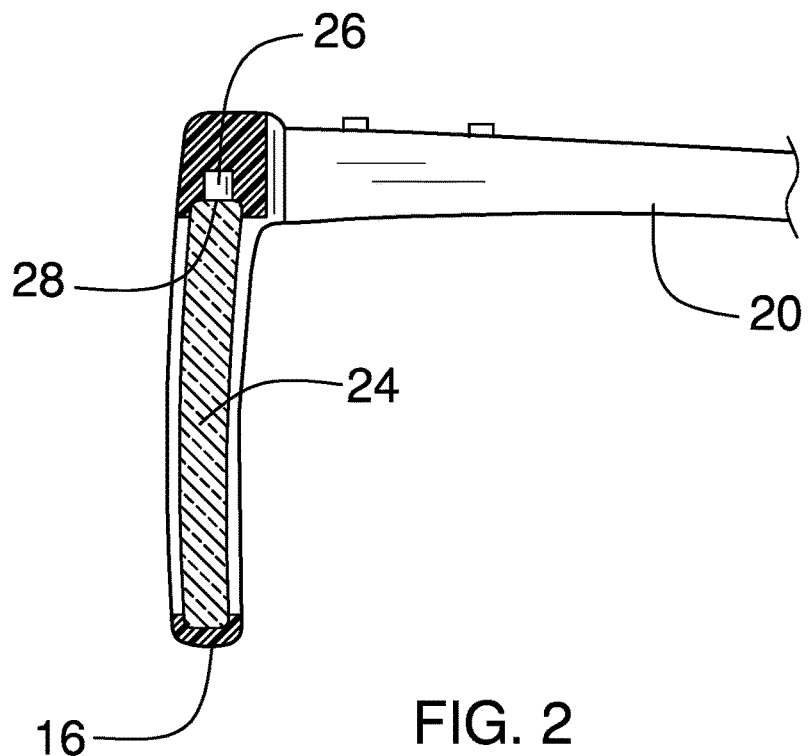
FIG. 2 is a cross-sectional view of an embodiment of the disclosure taken along line 2-2 of FIG. 1.
Figure 3:
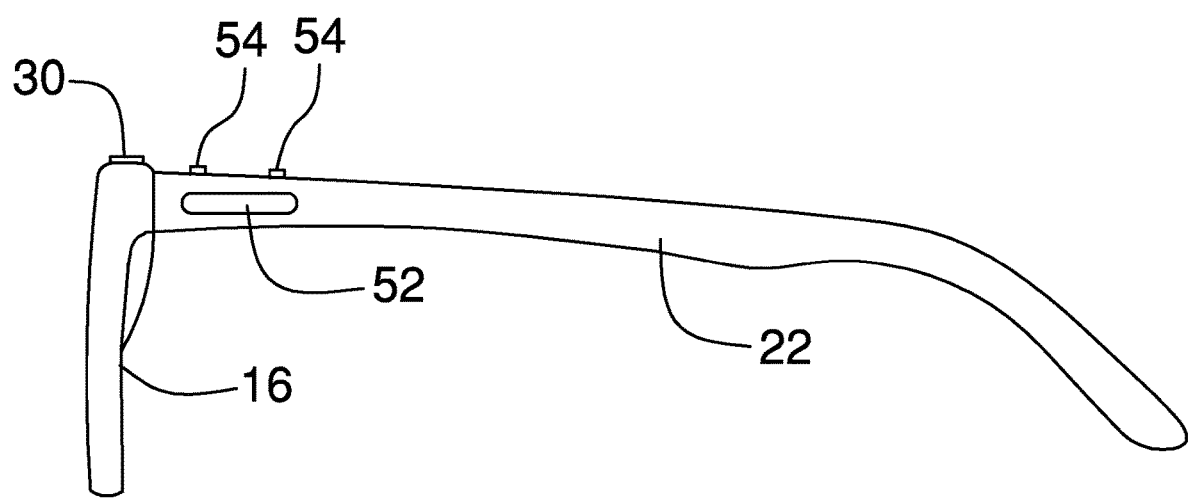
FIG. 3 is a side view of an embodiment of the disclosure.
Figure 4:
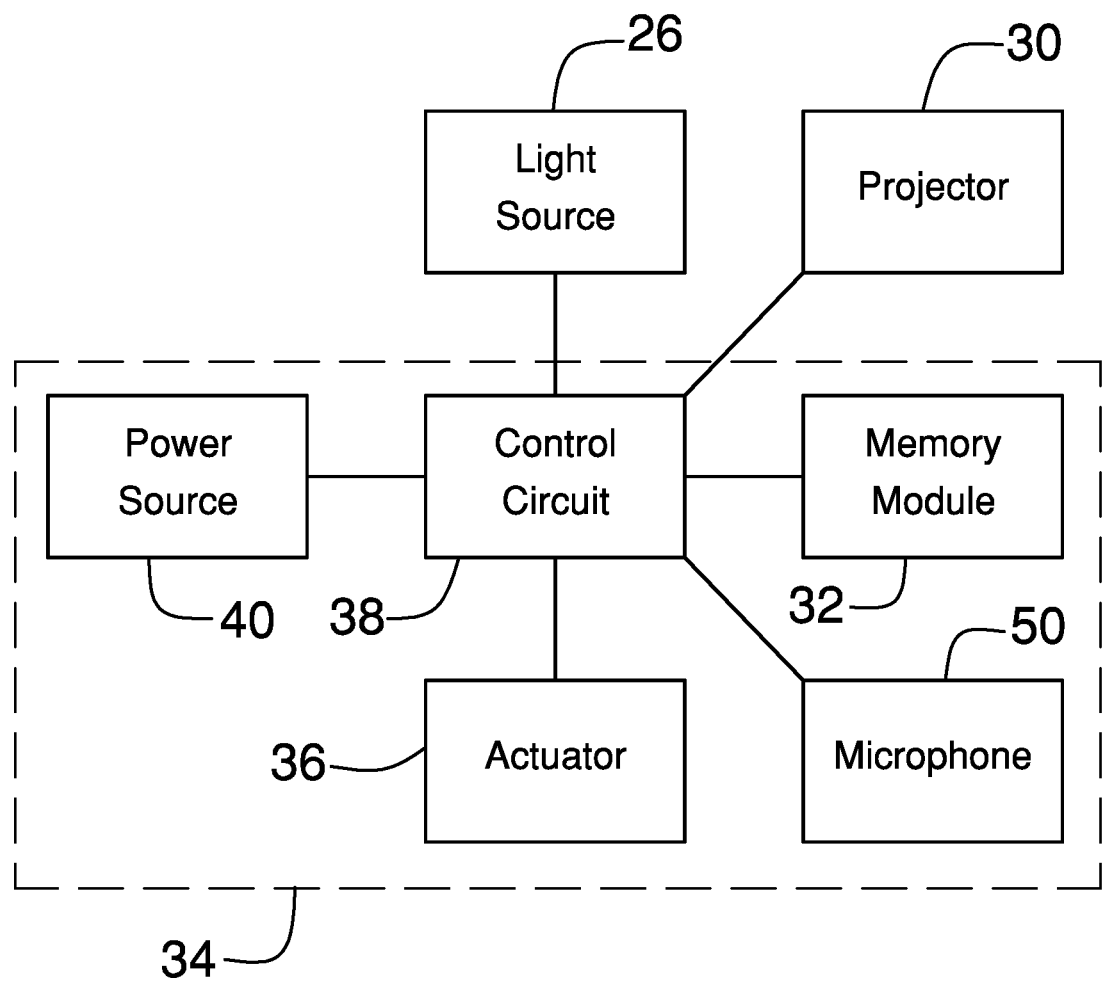
FIG. 4 is a schematic view of an embodiment of the disclosure.
Figure 5:
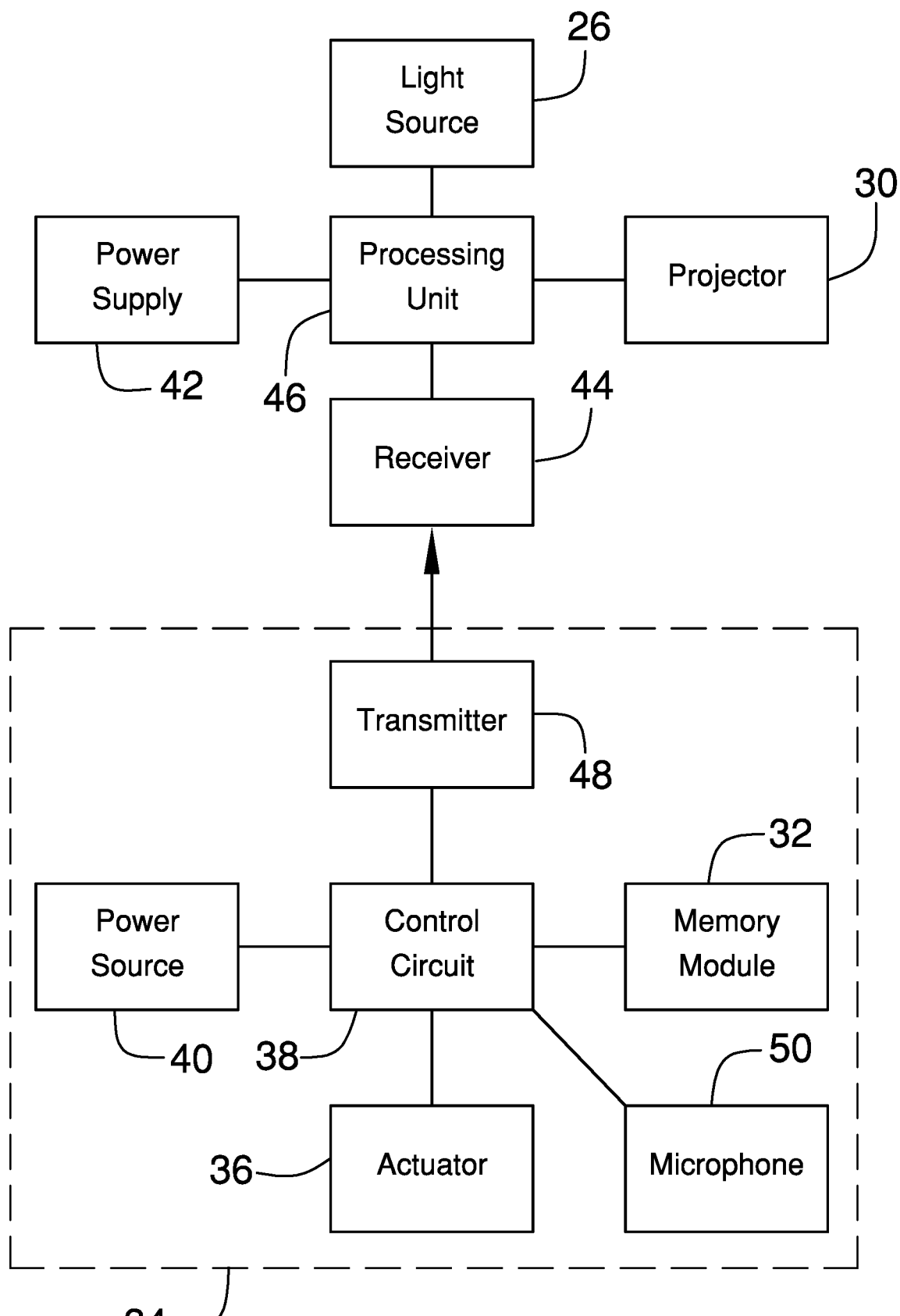
FIG. 5 is a schematic view of an embodiment of the disclosure.

With reference now to the drawings, and in particular to FIGS. 1 through 5 thereof, a new eyewear assembly embodying the principles and concepts of an embodiment of the disclosure and generally designated by the reference numeral 10 will be described.

As best illustrated in FIGS. 1 through 5, the illuminated eyewear 10 generally comprises a lens support 12 including a frame 14 including a pair of rims 16 and a bridge 18 that is attached to and extends between the rims 16. A first temple 20 is attached to one of the rims 16 and a second temple 22 is attached to another one of the rims 16. The lens support 12 may include any number of shapes and sizes typically used with eyewear and there is little to limit the shape and configurations that may be utilized, including rims 16 that may or may not form a closed loop. A pair of lenses 24 is mounted to the frame 14 wherein each of the rims 16 engages one of the lenses 24. The lens support 12 and lenses 24 may comprise any type of eyewear including prescription eyeglasses, sunglasses, fashion eyewear, and combinations thereof. Furthermore, the lens support 12 may be comprised of any conventional materials used for eyewear frames and temples. However, for the reasons presented below, materials which are translucent may be particularly useful.

A light source 26 is mounted on the lens support 12. The light source 26 illuminates perimeter edges 28 of the lenses 24 when the light source 26 is turned on. That is, as light travels through the lenses 24, it is scattered at the perimeter edges 28 and thereby illuminates the perimeter edges 28. The light source 26 is configured to have an adjustable intensity, i.e. the light source is dimmable, so that the user may selectively alter the brightness of the light emitted by the light source 26. Additionally, the light source 26 is configured to have a color that is changeable. The light source 26 may comprise LEDs, for example, that allow for selected color output such that the user may select between two or more colors.

The light source 26 may more specifically include light emitters that are mounted in the frame 14 and are directed toward the perimeter edges 28 of the lenses 24. This positioning may be preferred to ensure that light is directed into the lenses 24 between the outer and inner surfaces of the lenses 24. However, the light source 26 may be positioned anywhere such will adequately cause light to move into the lenses 24 and scatter outwardly at the perimeter edges 28.

The lens support 12 may have at least some portions thereof that are translucent and is illuminated by the light source 26 when the light source 26 is turned on. The light source 26 may include light emitters that are positioned in any or all areas of the lens support 12 that are desired to be illuminated. The light source 26 may include LEDs, rope lights, fiber optics or other suitable light emitters that are positionable in the frame 14, rims 16, bridge 18, first temple 20, and/or second temple 22.

In addition to the light source 26, a projector 30, having its own illumination emitter or which may utilize the light source 26, may also be mounted on the lens support 12. The projector 30 is configured to project an image directed upwardly from the rims 16 and therefore in a direction opposite of the lenses which extend down from the frame 14. The projector 30 may act as spotlight wherein an overlay or other indicia positioned thereon so that a silhouette of the indicia is projected upwardly from the eyewear. Thus, for example, should a person be wearing a baseball cap and turn on the projector 30, the indicia would be projected onto the underside of the brim of the baseball cap. Alternatively, the projector 30 may project illuminated images or video. In such a configuration the projector 30 is in communication with a memory module 32 having digital images stored thereon which may include still images, videos and the like.

A control assembly 34 is in communication with the light source 26 and is used to control the various features of the light source 26. For example, the control assembly 34 may be actuated to turn the light source 26 on and off, to alter an intensity of the light source 26, and to alter a color of the light source 26. Moreover, the control assembly 34 is in communication with the projector 30, if the projector 30 is provided, and may be actuated to turn the projector 30 on or off.

The control assembly 34, generally, includes an actuator 36 for controlling the light source and/or projector. A control circuit 38 is electrically coupled to the actuator 36 and a power source 40 is electrically coupled to the control circuit 38. The power source 40 would typically include a rechargeable battery that would power the control circuit 38. The control circuit 38 would typically be electrically coupled to the light source 26 and projector 30 such that the power source 40 also powers the light source 26 and projector 30. Alternatively, the light source 26 and projector 30 may be electrically coupled to a power supply 42 that is separate from the power source 40. The power source 40 and/or power supply 42 may be recharged in any number of conventional manners such as being plugged into an electric outlet, utilization of solar panels mounted on the lens support 12, a motion energy harvesting assembly mounted in the lens support 12, and the like.

The control assembly 34 may further include the memory module 32 that is electrically coupled to the control circuit 38. The memory module 32, comprising conventional electronic memory, may be used for storing software and application data for use in controlling the light source 26 and projector 30. Moreover, the memory module 23 may be used for storing images, both still images and video, thereon for projection by the projector 30. The stored images are accessed by the control circuit 38 and communicated to the projector 30 when the control assembly 34 is accordingly actuated.

The control assembly 34 itself may be either completely integrated into the lens support 12, may comprise a remote unit or a combination of both. For instance, a wireless receiver 44 may be positioned in the lens support 12 and integrated with the light source 26 and/or projector 30. The wireless receiver 44 may include a processing unit 46 and a power supply 42 for powering the processing unit 46, light source 26, and projector 30. A transmitter 48 is provided, which is electrically coupled to the control circuit 38, wherein the transmitter 48 in wireless communication with the wireless receiver 44. The control assembly 34 of this remote example may include a handheld, stand alone control, or may be incorporated in an application on a smart phone equipped with Bluetooth or other wireless protocol to communicate with the receiver 44. If a smart phone is utilized, typically a touch screen of the smart phone would serve as the actuator 36 to be actuated while controlling the light source 26, the projector 30 and for selecting images to be emitted by the projector 30. A smart phone further includes a microphone 50 that can be used to supplement or replace a tactile actuator wherein the user would simply speak the actuation desired to the smart phone, i.e. "turn on the lights," "turn the lights red," "fade lights in and out," etc. It should be readily apparent that all desired commands may be integrated into a smart phone application for such purposes.

Alternatively, as mentioned, the control assembly 36 may be mounted on the lens support 12 itself. In such an embodiment, the actuator 36 is positioned so that the user may can touch and tactilely engage the actuator 36. For example, the actuator 36 may be positioned on the first temple 20 and include a touch sensor 52 that detects one or two fingers positioned thereon. Thus, the user could use one finger to turn on the light source 26 and adjust its intensity while the second finger alters the color of the light source 26. Alternatively, the first temple 20 may include one portion of the actuator 36, i.e. a first button, and the second temple 22 may include another portion of the actuator 36, i.e. a second button, to allow for selection of various options depending on whether the first or second button is being engaged. Dials may be incorporated into the lens support 12, such as near or on the bridge 18. The actuator 36 is understood to possibly include multiple additional switches 54, which may include all variations of touch, tap, slide or press buttons, or touch sensors 52 may be used to select additional options discussed below and to control the projector 30 and select its projected image. A microphone 50 may be mounted on the lens support 12 such that the user could utilize voice commands in a similar manner as discussed above with respect to the smart phone application. Thus, it should be understood that the control assembly 34 may be presented in multiple manners that allow the user to have control over all features of the light source 26 and the projector 30. It should be understood that when discussing the positioning of the actuator 36, the first temple 20 may comprise a right or left temple and the second temple 22 may also be either the right or left temple as either or both may be used as desired without affecting the overall invention.

In use, the illuminated eyewear 10 is worn as conventional eyewear while allowing the user to determine the aesthetics thereof. Options would include illuminating the lenses 24 and in particular the perimeter images 28 thereof and also determining the color and intensity of the light being emitted from the lenses 24 due to light scattering and reflecting off of edges thereof as well as illuminating the lenses 24 themselves depending upon their construction and materials used. The user would be able to turn on the projector 30 to either project a static silhouette, images, or video. The light source 26 may be used to illuminate the bridge 18, frame 14, rims 16, first temple 20, or second temple 22 all at the same time or independently of each other as well as allowing for different colors to be used in different areas of the lens support 12. The control circuit 38 may be further programmed to allow the light source 26 to flash, pulsate, etc., while also changing colors if so desired. In this way, the light source 26 allows the user of the illuminated eyewear 10 to drastically alter the appearance of the lens support 12 and lenses 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. Eyewear having alterable aesthetic capabilities, said eyewear comprising:
    a lens support including:
        a frame including a pair of rims and a bridge being attached to and extending between the rims;
        a first temple being attached to one of the rims and a second temple being attached to another one of the rims;
    a pair of lenses being mounted to the frame wherein each of the rims engages one of the lenses;
    a light source being mounted on the lens support, the light source illuminating perimeter edges of the lenses when the light source is turned on; and
    a single projector being mounted on an upper surface of the bridge of the frame of the lens support between the pair of rims, the projector being configured to project an image directed upwardly from the rims.

2. The eyewear according to claim 1, wherein the light source is configured to have an adjustable intensity.

3. The eyewear according to claim 2, wherein the light source is configured to have a color that is changeable.

4. The eyewear according to claim 3, further including a control assembly being in communication with the light source, the control assembly being actuated to turn the light source on and off, the control assembly being actuated to alter an intensity of the light source, the control assembly being actuated to alter a color of the light source.

5. The eyewear according to claim 4, wherein the control assembly includes:
    an actuator being mounted on the lens support, the actuator being positioned on the first temple;
    a control circuit being electrically coupled to the actuator; and
    a power source being electrically coupled to the control circuit.

6. The eyewear according to claim 2, further including a control assembly being in communication with the light source, the control assembly being actuated to turn the light source on and off, the control assembly being actuated to alter an intensity of the light source.

7. The eyewear according to claim 1, wherein the light source is configured to have a color that is changeable.

8. The eyewear according to claim 1, wherein the light source includes light emitters mounted in the frame and being directed toward the perimeter edges of the lenses.

9. The eyewear according to claim 1, wherein the lens support has at least some portions thereof being translucent and being illuminated by the light source when the light source is turned on.

10. The eyewear according to claim 9, wherein the light source includes light emitters being mounted in the temples to illuminate the temples when the light source is turned on.

11. The eyewear according to claim 1, further including a control assembly being in communication with the light source, the control assembly being actuated to turn the light source on and off.

12. The eyewear according to claim 1, further including a control assembly being in communication with the light source, the control assembly being actuated to turn the light source on and off, the control assembly being in communication with the projector, the control assembly being actuated to turn the projector on or off.

13. The eyewear according to claim 1, wherein the control assembly includes:
    an actuator being mounted on the lens support, the actuator being positioned on the first temple;
    a control circuit being electrically coupled to the actuator; and
    a power source being electrically coupled to the control circuit.

14. The eyewear according to claim 13, wherein the control assembly includes a memory module being electrically coupled to the control circuit, the memory module having stored images thereon for projection by the projector.

15. Eyewear having alterable aesthetic capabilities, the eyewear comprising:
    a lens support including:
        a frame including a pair of rims and a bridge being attached to and extending between the rims;
        a first temple being attached to one of the rims and a second temple being attached to another one of the rims;
    a pair of lenses being mounted to the frame wherein each of the rims engages one of the lenses;
    a light source being mounted on the lens support, the light source illuminating perimeter edges of the lenses when the light source is turned on, the light source being configured to have an adjustable intensity, the light source being configured to have a color that is changeable;
    the light source including light emitters mounted in the frame and being directed toward the perimeter edges of the lenses;
    the lens support having at least some portions thereof being translucent and being illuminated by the light source when the light source is turned on;
    the light source including light emitters being mounted in the temples to illuminate the temples when the light source is turned on;
    a single projector being mounted on an upper surface of the bridge of the frame of the lens support between the pair of rims, the projector being configured to project an image directed upwardly from the rims;

a control assembly being in communication with the light source, the control assembly being actuated to turn the light source on and off, the control assembly being actuated to alter an intensity of the light source, the control assembly being actuated to alter a color of the light source;

the control assembly being in communication with the projector, the control assembly being actuated to turn the projector on or off;

the control assembly including:
  an actuator being mounted on the lens support, the actuator being positioned on the first temple;
  a control circuit being electrically coupled to the actuator;
  a power source being electrically coupled to the control circuit; and
  a memory module being electrically coupled to the control circuit, the memory module having stored images thereon for projection by the projector.

\* \* \* \* \*